(12) United States Patent
Takeda

(10) Patent No.: US 7,395,184 B2
(45) Date of Patent: Jul. 1, 2008

(54) LOADED WEIGHT MEASUREMENT METHOD AND LOADED WEIGHT MEASUREMENT DEVICE FOR DUMP TRUCK

(75) Inventor: Shu Takeda, Tochigi (JP)

(73) Assignee: Komatsu, Ltd., Tokyo (JP)

( * ) Notice: Subject to any disclaimer, the term of this patent is extended or adjusted under 35 U.S.C. 154(b) by 463 days.

(21) Appl. No.: 11/033,474

(22) Filed: Jan. 12, 2005

(65) Prior Publication Data

US 2005/0167164 A1     Aug. 4, 2005

(30) Foreign Application Priority Data

Jan. 15, 2004     (JP) ............................. 2004-007587

(51) Int. Cl.
G01G 19/08     (2006.01)
(52) U.S. Cl. ...................... 702/174; 177/25.13; 177/136
(58) Field of Classification Search ................. 702/174; 177/25.13, 136
See application file for complete search history.

(56) References Cited

U.S. PATENT DOCUMENTS

| | | | |
|---|---|---|---|
| 4,630,227 A * | 12/1986 | Hagenbuch | 702/174 |
| 4,845,648 A * | 7/1989 | Hagenbuch | 702/174 |
| 5,327,347 A * | 7/1994 | Hagenbuch | 701/50 |
| 5,528,499 A * | 6/1996 | Hagenbuch | 701/50 |
| 5,644,489 A * | 7/1997 | Hagenbuch | 455/456.1 |
| 5,817,989 A | 10/1998 | Shimizu et al. | |
| 7,247,803 B2 * | 7/2007 | Takeda et al. | 177/137 |

FOREIGN PATENT DOCUMENTS

JP     61-034425 A     2/1986

* cited by examiner

*Primary Examiner*—Randy W Gibson
(74) *Attorney, Agent, or Firm*—Westerman, Hattori, Daniels & Adrian, LLP.

(57) ABSTRACT

To measure loaded weight in respective work statuses of a dump truck. The loaded weight of a dump truck 11 is calculated and stored at prescribed time intervals. It is judged whether or not the dump truck 11 has transferred to a transporting status (S31-S33), and if it has transferred to a transporting status (S31: YES, S32: YES, S33: YES), then the transported weight G1 at the end of loading and immediately before transition to the transporting status is calculated and stored (S34). The transported weight G2 during the period in which the truck is in the transporting status is also calculated and stored (S35). If the truck has transferred from the transporting status to an unloading status (S36: YES), then the transported weight G3 before unloading is calculated and stored (S37). A transported weight selected from these respective transported weights G1-G3 is read out and output to a display device, or the like (S38, S39). Thereby, it is possible to measure the transported weight at a previously established plurality of measurement timings.

4 Claims, 12 Drawing Sheets

LOADED WEIGHT MEASUREMENT METHOD AND LOADED WEIGHT MEASUREMENT DEVICE FOR DUMP TRUCK

BACKGROUND OF THE INVENTION

1. Field of the Invention

The present invention relates to a loaded weight measurement method and loaded weight measurement device for a dump truck.

2. Description of the Related Art

A method is known in the prior art (Japanese Patent Laid-open No. 61-34425) in which the weight of cargo is measured by detecting the load applied respectively to the front wheels and the rear wheels of a dump truck and correcting these detected loads on the basis of the angle of inclination of the vehicle and the center of gravity of the vehicle.

According to the prior art technology described in Japanese Patent Laid-open No. 61-34425, it is possible to determine the weight of a cargo simply by detecting the loads applied respectively to the front wheels and rear wheels. However, in this prior art technology, no consideration is given to the timing at which the loaded weight is measured, and hence the measurement timing is fixed.

A dump truck is used repeatedly to transport a cargo, such as sand, in a construction site or an excavation site, for example. The cargo loaded into the dump truck at the loading point is conveyed to a prescribed position by the dump truck, where it is then unloaded. When it has finished unloading, the dump truck returns to the loading point and is again loaded with cargo.

The dump truck repeats a work cycle of this kind. In order to ascertain the state of progress of the work or the operating efficiency of the dump truck, it is necessary to measure the weight of cargo transported by the dump truck (the transported weight) in each work cycle. In the present specification, the weight of the cargo transported by the dump truck is called the "transported weight", in order to distinguish it from the loaded weight, which is a momentary measurement value.

In order to ascertain the state of progress of the work accurately, it is desirable that the transported weight is measured under uniform conditions every day. Therefore, it is possible to measure the transported weight in a relatively stable fashion if measurement is made during transportation when the dump truck is traveling, rather than in other circumstances. Consequently, in the prior art, the transported weight is measured only during travel of the dump truck (during transportation of the cargo).

However, there is no guarantee that the state is always stable during transportation, and depending on the work site, there may be cases where the truck has to travel along very rough roads having an extremely uneven road surface. When a truck is traveling along rough roads of this kind, the vehicle body sways significantly, and it is difficult to measure the transported weight accurately.

In particular, articulated type dump trucks which have swingably coupled front and rear vehicle bodies are often used in sites having rough terrain, such as mines, and hence they are subject to severe swaying during travel. Therefore, cases may arise where the transported weight cannot be measured accurately during travel.

SUMMARY OF THE INVENTION

The present invention was devised with the aforementioned problem in view, one object thereof being to provide a loaded weight measurement method and a loaded weight measurement device for a dump truck, whereby the loaded weight can be measured respectively in a previously established plurality of work statuses. It is a further object of the present invention to provide a loaded weight measurement method and loaded weight measurement device for a dump truck, whereby the loaded weight can be measured respectively in a previously established plurality of work statuses, and the loaded weight for a selected work status can be output. It is a further object of the present invention to provide a loaded weight measurement method and loaded weight measurement device for a dump truck, whereby respective loaded weight values in a plurality of work statuses can be measured at low cost. Other objects of the present invention will become apparent from the following description of the embodiments.

In order to achieve the aforementioned objects, the loaded weight measurement method for a dump truck relating to the present invention comprises: a first step of respectively detecting a plurality of work statuses of a dump truck; a second step of respectively detecting a plurality of basic information for calculating the loaded weight of the dump truck; a third step of calculating respective loaded weight values of the dump truck in a previously established plurality of prescribed work statuses, of the respective work statuses detected in the first step, on the basis of the respective basic information detected in the second step; a fourth step of respectively storing the calculated loaded weight values; and a fifth step of outputting all or a portion of the loaded weight values thus stored.

The fifth step may be composed in such a manner that only the loaded weight value in the selected prescribed work status is output, of the respective loaded weight values stored in the fourth step.

Of the respective work statuses detected in the first step, the plurality of prescribed work statuses may include: a particular work status; a status of transition from a work status to the particular work status; and a status of transition from the particular work status to another work status.

For example, in the first step, it may be detected whether the dump truck is in an empty status, a loading status, a transporting status, or an unloading status. Furthermore, the third step may respectively calculate: a first loaded weight in a case where the dump truck has completed loading and is transferring from the loading status to the transporting status; a second loaded weight in a case where the dump truck is in a transporting status; and a third loaded weight in a case where the dump truck is in a status prior to unloading and is transferring from the transporting status to the unloading status; the respective loaded weights being calculated on the basis of the basic information detected respectively in the second step.

In an embodiment of the present invention, the dump truck comprises: a set of equalizer bars respectively provided rotatably on the left and right-hand sides of a vehicle body; first vehicle wheels supported respectively by means of first suspension devices on one side of each equalizer bar; second vehicle wheels supported respectively by means of second suspension devices on the other side of each equalizer bar; and third vehicle wheels provided respectively on the left and right-hand sides of the vehicle body separately from the equalizer bars, and being supported respectively by means of third suspension devices. Furthermore, the second step may comprise: a step 2A of detecting a first load applied to either the first suspension device or the second suspension device, as one of the basic information; a step 2B of detecting a second load applied to the third suspension device, as one of the basic information; a step 2C of detecting the angle of inclination of the vehicle body as one of the basic information; and a step 2D of calculating the loaded weight on the basis of the first and second loads detected respectively in the steps 2A and 2B, and the angle of inclination detected in the step 2C.

Moreover, the step 2D may comprise: a step 2D1 of calculating a total load applied to the first and second suspension devices on the basis of the ratio between the respective distances from the center of rotation of the equalizer bar to the first and second suspension devices, and the first load detected in the first step; a step 2D2 of respectively calculating a vertical load from the total load calculated in step 2D1 and the second load detected in the second step, on the basis of the angle of inclination detected in the third step; and a step 2D3 of calculating the loaded weight by adding together the vertical component of the first load and the vertical component of the second load calculated in the step 2D2.

The loaded weight measurement device for a dump truck according to a further aspect of the present invention comprises: loaded weight calculating means for calculating the loaded weight of a dump truck; work status detecting means for respectively detecting a plurality of work statuses of the dump truck; storage means for respectively storing loaded weight values, of the plurality of loaded weight values respectively calculated by the loaded weight calculating means, in cases where a plurality of prescribed work statuses are detected by the work status detecting means; and output selecting means for reading out and outputting a loaded weight value for a prescribed work status selected from the plurality of prescribed work statuses, from the storage means.

According to the present invention, it is possible to measure respective values for the weight of cargo loaded into a dump truck, in a plurality of work statuses. By measuring the loaded weights in respective work statuses, it is possible to monitor the operational situation of the dump truck and the state of progress of work, and the like, from multiple perspectives, and hence operability is improved.

According to the present invention, it is possible to select which of the respective loaded weight values measured in different work statuses is to be used, in accordance with the work environment of the dump truck, and the like. Therefore, suitable measurement timing can be selected in accordance with the work environment of the dump truck, and consequently, the loaded weight can be measured more accurately.

DESCRIPTION OF THE PREFERRED EMBODIMENTS

Figure 1:
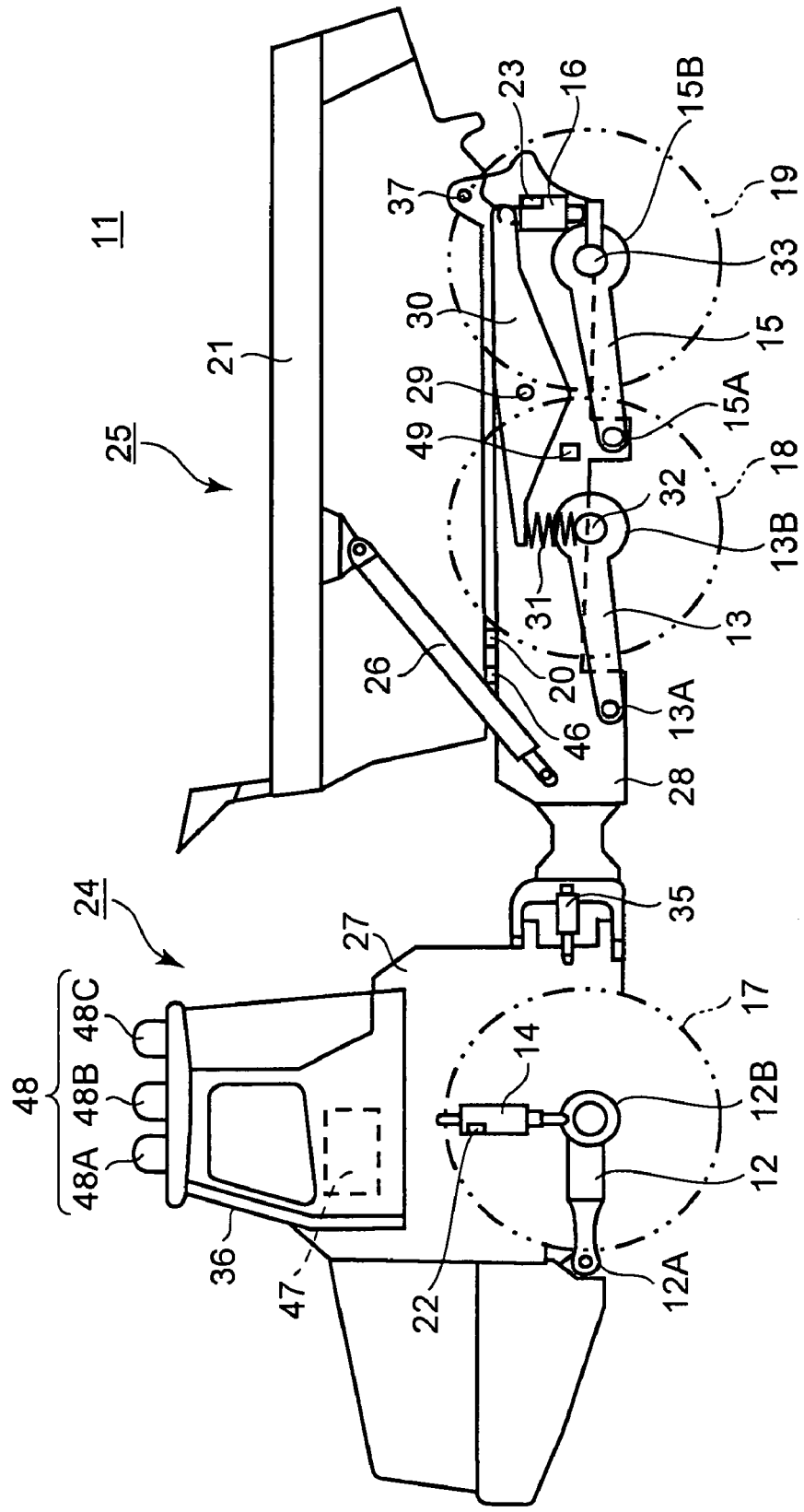
FIG. 1 is a side view of a dump truck relating to an embodiment of the present invention.

Below, an embodiment of the present invention is described in detail with reference to the drawings. As described below, the present embodiment discloses a dump truck (11) having vehicle bodies (24, 25); a vessel (21) provided on the vehicle body (25); a set of equalizer bars (30) respectively provided rotatably on the left and right-hand sides of the vehicle body (25); first vehicle wheels (18) supported respectively on one side of each equalizer bar (30) by means of a first suspension device (31); second vehicle wheels (19) supported respectively on the other side of each equalizer bar (30) by means of a second suspension device (16); and third vehicle wheels (17) provided respectively on the left and right-hand sides of the vehicle body (24), separately from the equalizer bars (30), and supported respectively by means of a third suspension device (14).

The dump truck (11) further comprises: first load detecting means (23, 230) for detecting a first load acting on either the first suspension device (31) or the second suspension device (16); second load detecting means (22, 220) for detecting a second load acting on the third suspension device (14); angle of inclination detecting means (20) for detecting the angle of inclination of the vehicle body (25); control means (47) for calculating the loaded weight of the vessel (21) on the basis of the first and second loads and the angle of inclination; and outputting means (48, 47B, 114) for outputting the loaded weight calculated by the control means (47).

As described in detail hereinafter, in the present embodiment, a plurality of work statuses of the dump truck (11) are detected respectively, and these statuses are monitored to see whether or not they have reached a prescribed work status established previously. In the present embodiment, if a prescribed work status is detected, then the loaded weight in that work status is stored in storage means, such as a memory. The measurement values for a prescribed plurality of work statuses are stored respectively in the storage means. The dump truck manager, or the like, is able to the measurement values to be adopted, in accordance with the working environment of the dump truck (11), and the like.

First Embodiment

A first embodiment of the present invention will be described with reference to FIG. 1-FIG. 11. FIG. 1 is a side view of an articulated type dump truck 11.

As shown in FIG. 1, the dump truck 11 comprises a front vehicle body 24 disposed on the front side and a rear vehicle body 25 disposed on the rear side. The front vehicle body 24 is supported by means of a front frame 27 and the rear vehicle body 25 is supported by means of a rear frame 28. The rear frame 28 is coupled bendably and swingably with respect to the front frame 27. An driver's cabin 36 is mounted on the front frame 27.

A left and right-hand pair of steering cylinders 35, 35 are provided spanning between the front frame 27 and the rear frame 28. By respectively extending or contracting the steering cylinders 35, 35, the rear frame 28 can be made to turn with respect to the front frame 27, and hence a steering operation can be performed.

A vessel 21 for loading a cargo, such as sand, for example, is provided on top of the rear frame 28. A pair of lift cylinders 26 and 26 are provided between the left and right-hand sides of the front portion of the vessel 21 and the rear frame 28. The lower rear portion of the vessel 21 is attached rotatably to the rear frame 28 by means of vessel pins 37. By extending or contracting the lift cylinders 26, 26, the vessel 21 is rotated upwards and downwards about the vessel pins 37. The operation of raising up the vessel 21 is called "tipping up", and the operation of lowering the vessel 21 is called "tipping down". FIG. 1 shows a state where the vessel 21 has been lowered and is seated on the rear frame 28.

A front arm 12 which is V-shaped in plan view is provided rotatably on the front frame 27. The front end portion 12A of the front arm 12 (namely, the apex of the V shape) is supported on the lower portion of the front arm 27, rotatably in the vertical direction.

A pair of left and right-hand front wheels 17, 17 are installed on the two side faces of the rear end portion 12B of the front arm 12. These respective front wheels correspond to one example of "third vehicle wheels". The upper portion of the rear end section 12B is supported on the front frame 27 via a front suspension cylinder 14, which is one example of a "third suspension device".

Figure 2:
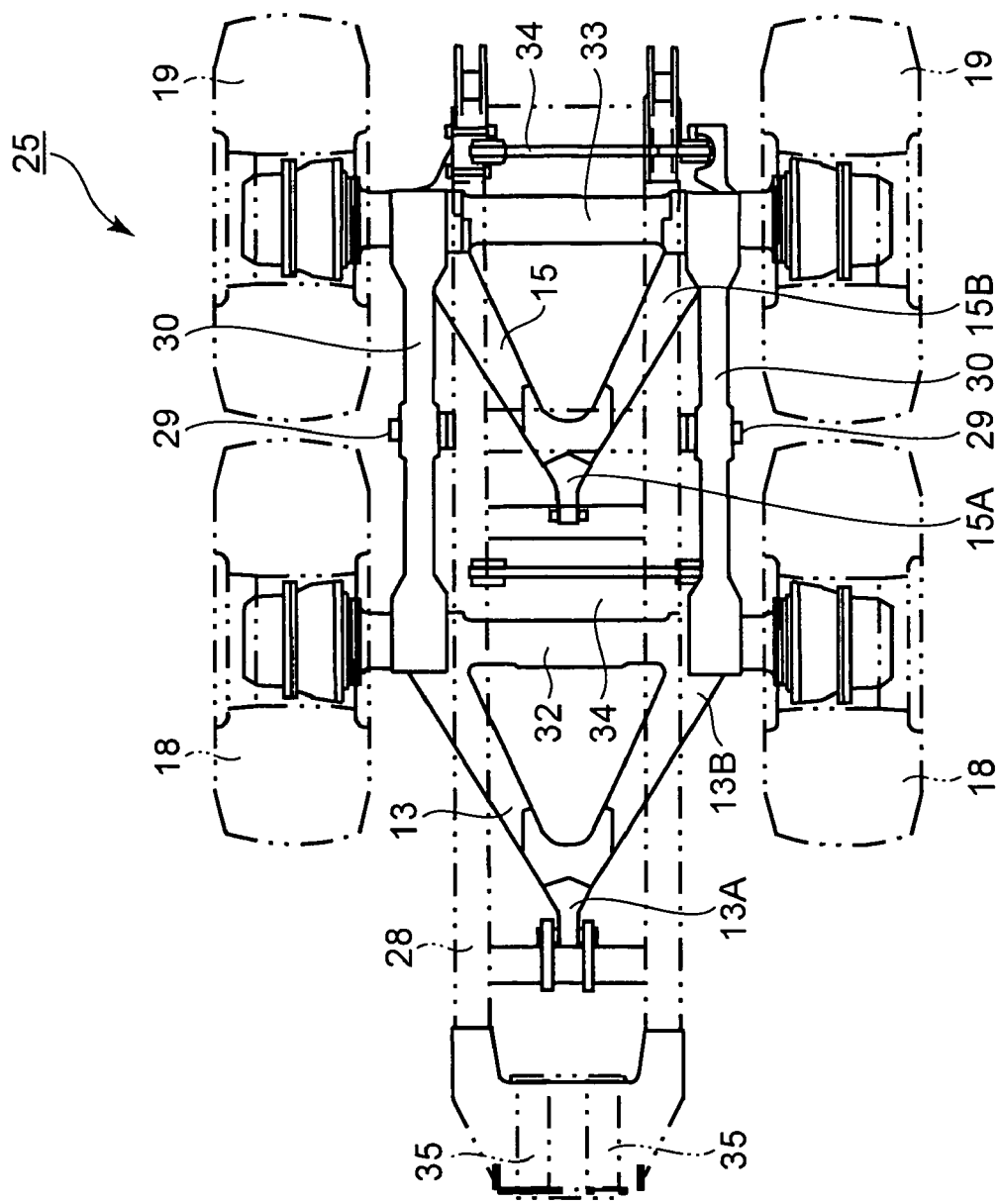
FIG. 2 is a plan view showing an enlarged view of a rear frame.

Here, FIG. 2 is a plan view of a rear frame 28 showing a state where the vessel 21 has been removed. As illustrated in FIG. 1 and FIG. 2, the left and right-hand pair of equalizer bars 30, 30 are provided rotatably on either side face of the rear frame 28. The approximate center portions of the equalizer bars 30, 30 are respectively attached rotatably to the rear frame 28 by means of pins 29, 29.

A center arm 13 and a rear arm 15 are respectively provided rotatably on the lower portion of the rear frame 28. The center arm 13 and the rear arm 15 are also formed respectively in a V shape when observed in plan view, similarly to the front arm 12.

The front end section 13A of the center arm 13 is supported rotatably in the vertical direction on the lower front side of the rear frame 28. A pair of left and right-hand central wheels 18, 18 are installed on the two side faces of the rear end portion 13B of the center arm 13. These respective center wheels 18, 18 correspond to one example of the "first vehicle wheels". The upper portion of the rear end section 13B is supported on the lower side of the front end portion of the equalizer bars 30, 30, by means of springs 31, 31, which are one example of a "first suspension device".

The front end section 15A of the rear arm 15 is supported rotatably in the vertical direction on the lower rear side of the rear frame 28. A pair of left and right-hand rear wheels 19, 19 are installed on the two side faces of the rear end portion 15B of the rear arm 15. These rear wheels 19, 19 correspond to one example of "second vehicle wheels". The upper portion of the rear end section 15B is supported on the lower side of the rear end portion of the equalizer bars 30, by means of a rear suspension cylinder 16, which is one example of a "second suspension device".

Figure 3:
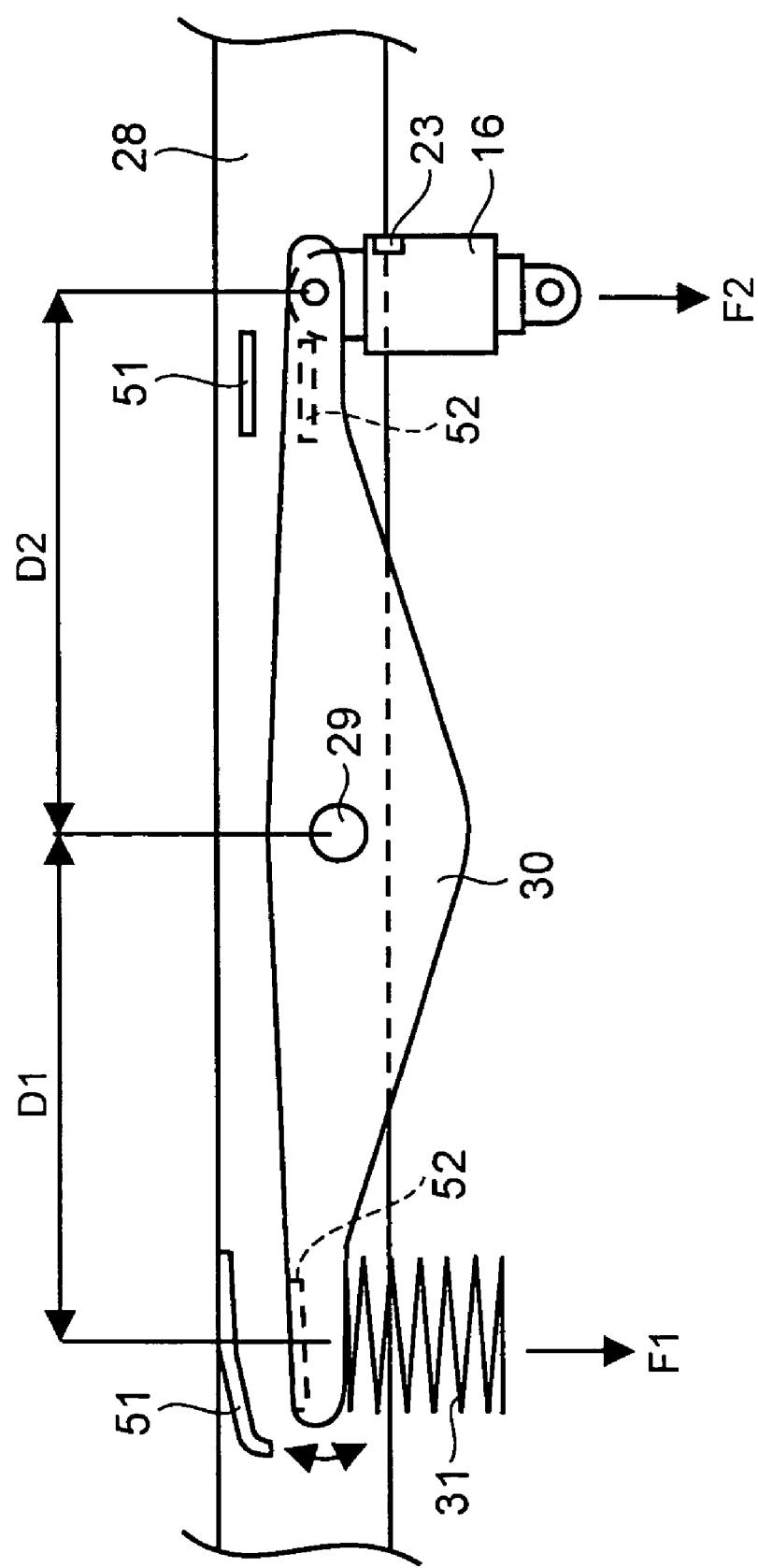
FIG. 3 is a side view showing an enlargement of the vicinity of an equalizer bar.

FIG. 3 is a side view showing a partial enlargement of an equalizer bar 30. As shown in FIG. 3, stoppers 51, 51 are provided respectively on either side face of the rear frame 28, in such a manner that they correspond respectively to the front end section and the rear end section of the equalizer bar 30. The stoppers 51, 51 are provided in such a manner that they project slightly towards the equalizer bar 30 from the side face of the rear frame 28.

Furthermore, bases 52, 52 are provided respectively on the side face of the equalizer bar 30 in such a manner that they correspond to the stoppers 51, 51. The bases 52, 52 are provided in such a manner that they project slightly towards the equalizer bar 30. If the equalizer bar 30 is rotated through a prescribed angle or more, then the bases 52, 52 abut against the stoppers 51, 51, thereby preventing further rotation.

Returning to FIG. 1, a controller 47 for measuring the loaded weight is provided in the driver's cabin 36 of the dump truck 11. The controller 47 is one example of "control means".

Furthermore, an external display lamp set 48 is provided at the base of the driver's cabin 36. This external display lamp set 48 serves to provide an external display indicating the ratio of the actual loaded weight to the rated loaded weight. The external display lamp set 48 may be constituted, for example, by a plurality of lamps 48A, 48B and 48C, each having a different color. For instance, lamp 48A is green, lamp 48B is orange and lamp 48C is red.

The controller 47 controls the lighting up and extinguishing of the lamps 48A-48C in accordance with the weight of the cargo loaded into the vessel 21. For example, if the loaded weight is 50% or less of the rated loaded weight, then the controller 47 does not light up any of the lamps. If the loaded weight is 50-89% of the rated loaded weight, then the controller 47 lights up the green lamp 48A. If the loaded weight is 90-100% of the rated loaded weight, then the controller 47 lights up the orange lamp 48B. Furthermore, if the loaded weight is 100% or above of the rated loaded weight, then the controller 47 lights up the red lamp 48C.

To take account of errors in the measurement of the loaded weight, it is also possible to light up the orange lamp 48B if the loaded weight is within 90-104% of the rated loaded weight, and similarly, to light up the red lamp 48C if the loaded weight is 105% or above of the rated loaded weight. Furthermore, the colours of the lamps and the loaded weight categories (50% or below, 50-89%, 90-100% and 100% or above) are only examples and may be modified in various ways.

The loading operator who is loading the cargo into the vessel 21 of the dump truck 11 observes the display on the external display lamp set 48 while carrying out the loading operation. The loading operator loads the cargo into the vessel 21 in such a manner that the loaded weight becomes approximately 100% of the rated loaded weight.

An inclination sensor 20, which is one example of "angle of inclination detecting means", is provided in the rear frame 28. This inclination sensor 20 measures the inclination of the vehicle body in the forward/rearward direction and outputs a detection signal to the controller 47.

A seating sensor 46 is provided between the rear frame 28 and the vessel 21. This seating sensor 46 serves to judge whether or not the vessel 21 is seated on the rear frame 28. If the vessel 46 is seated on the rear frame 28, then the seating sensor 46 detects this seated state and outputs a signal to the controller 47.

A vehicle speed sensor 49 is provided on the output shaft of the transmission (not illustrated). This vehicle speed sensor 49 detects the number of revolutions of the output shaft (namely, the vehicle speed), and outputs the result to the controller 47.

A front pressure sensor 22 is provided in the front suspension cylinder 14 as one example of a "second load detecting device". This front pressure sensor 22 detects the pressure of the oil inside the front suspension cylinder 14 and outputs the detected pressure to the controller 47.

Similarly, a rear pressure sensor 23 is provided in the rear suspension cylinder 16 as one example of a "first load detecting device". This rear pressure sensor 23 detects the pressure of the oil inside the rear suspension cylinder 16 and outputs the detected pressure to the controller 47.

The aforementioned pressure sensors 22 and 23, the inclination sensor 20, the seating sensor 46 and the vehicle speed sensor 49 are respectively connected electrically to the controller 47. As described hereinafter, the controller 47 is able to receive signals from the respective sensors.

Figure 4:
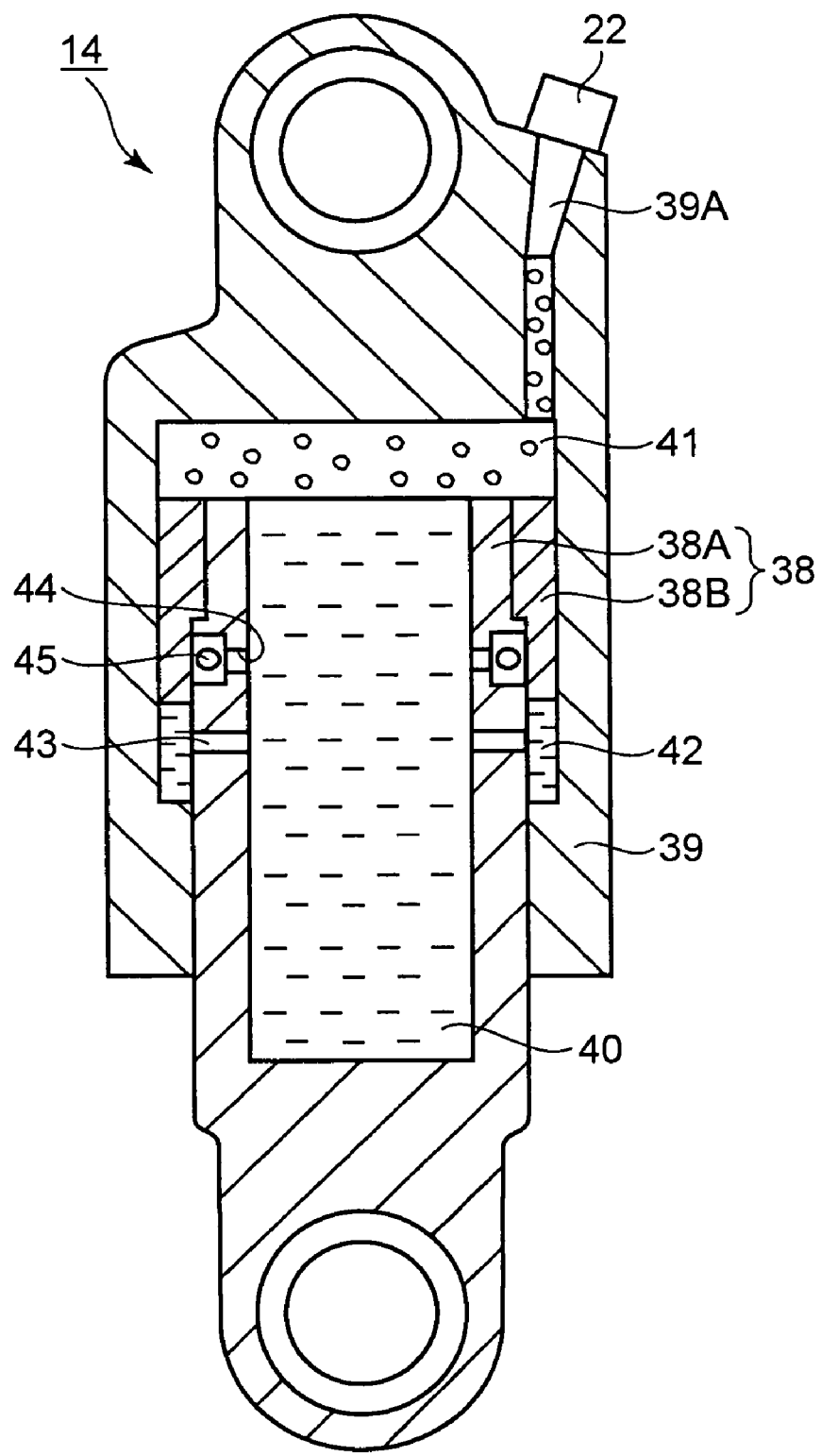
FIG. 4 is a cross-sectional diagram of a suspension cylinder.

FIG. 4 shows a cross-sectional diagram of a suspension cylinder. Here, a front suspension cylinder 14 is shown as an example, but a similar composition is also adopted for the rear suspension cylinder 16.

As shown in FIG. 4, the front suspension cylinder 14 comprises a piston 38 and a cylinder 39 to which this piston 38 is attached in a slidable fashion. The piston 38 comprises, for example, a bottomed cylinder-shaped piston main body 38A and a cylindrical ring member 38B provided on the outer circumference of the upper portion of the piston main body 38A.

Oil 40 is sealed inside the piston main body 38A. Nitrogen gas 41 is sealed in the space between the piston 38 and the cylinder 39.

A ring-shaped cavity 42 is formed between the piston main body 38A and the cylinder 39, in a position below the ring member 38B. A prescribed number of first orifices 43 are provided at a prescribed position in the longitudinal direction of the piston main body 38A, these orifices being spaced at intervals in the circumferential direction. The first orifices 43 are formed respectively in such a manner that the internal space of the piston main body 38A and the cavity 42 are interconnected. Furthermore, a prescribed number of second orifices 44 are provided respectively in a different position to the first orifices 43 in the longitudinal direction, these second orifices being spaced at intervals in the circumferential direction. Check bores 45 are provided respectively to the outer side of each second orifice 44.

If, for example, the front wheels 17 ride up onto a projection, or the like, in the road surface, then the front wheels 17 are raised by the projection and hence the piston 38 moves upwards and enters inside the cylinder 39. More specifically, the front suspension cylinder 14 is compressed. Thereby, when the piston 38 enters inside the cylinder 39, the volume of the space formed between the upper part of the piston 38 and the cylinder 39 is reduced, and hence the nitrogen gas 41 is compressed. Furthermore, the pressure of the oil 40 sealed inside the piston main body 38A also increases when the front suspension cylinder 14 is compressed. Accordingly, the oil 40 inside the piston main body 38A flows into the cavity 42 by passing through the respective first orifices 43 and second orifices 44.

On the other hand, when the front wheels 17 have ridden over the projection, the piston 38 moves downwards and the front suspension cylinder 14 extends. When the piston 38 retracts inside the cylinder 39, then the pressure in the piston main body 38A declines. Since the second orifices 44 are sealed respectively by the check bores 45, then the oil 40 in the cavity 42 returns to the piston main body 38A by passing through the first orifices 43 only.

A pressure measurement hole 39A for measuring the pressure of the nitrogen gas 41 is formed in the upper side of the cylinder 39. One end of this pressure measurement hole 39A is connected to the space between the cylinder 39 and the piston 38, and the other end thereof is open externally on the upper side of the cylinder 39. A front pressure sensor 22 is provided on this other end of the pressure measurement hole 39A.

The pressure of the nitrogen 41 sealed between the cylinder 39 and the piston 38 is guided to the front pressure sensor 22, by means of the pressure measurement hole 39A. The front pressure sensor 22 converts the pressure of the nitrogen gas 41 into an electrical signal, which is output to the controller 47. By measuring the pressure of the nitrogen gas 41, it is possible to measure the load (which corresponds to an example of the "second load") that is applied to the front suspension cylinder 14. By this means, it is possible to determine the load applied to the front wheel 17 to which the front suspension cylinder 14 is attached.

Figure 5:
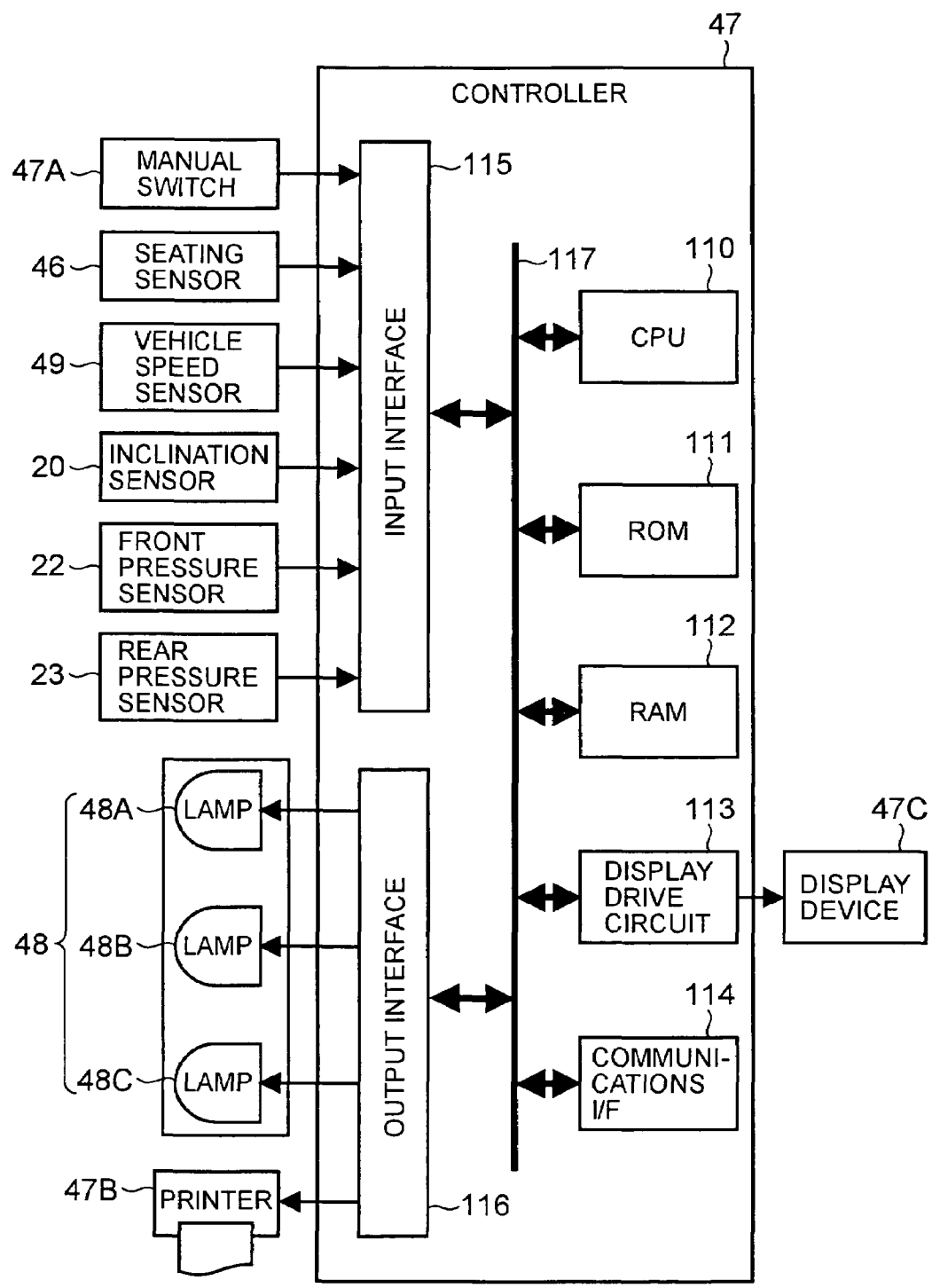
FIG. 5 is a block diagram showing the circuit structure of a controller.

FIG. 5 is a block diagram showing the general composition of the controller 47. The controller 47 corresponds to one example of a "loaded weight measurement device for a dump truck". The controller 47 may be constituted by a microcomputer system.

The controller 47 may be constituted, for example, by a CPU (Central Processing Unit) 110, a ROM (Read Only Memory) 111, a RAM (Random Access Memory) 112, a display drive circuit 113, a communications interface 114, an input interface 115, an output interface 116, and a bus 117 which interconnects these respective units.

The CPU 110 reads out and executes microprogram code stored in the ROM 111. Thereby, respective processes as described below are implemented. The RAM 112 is used as a work area for temporarily storing results during calculation. Furthermore, control flag information, or the like, may also be stored in the RAM 112.

The display drive circuit 113 drives a display device 47C provided inside the driver's cabin 36. Information relating to the loaded weight, and the like, may be displayed on the display device 47C, as and when appropriate. The communications interface 114 may be provided when data communications are performed with a management server (not illustrated) which is disposed in a management center, or the like. If the display device 47C is not used, then the display drive circuit 113 is not necessary. Furthermore, if the controller 47 does not conduct data communications, or the like, with an external device, then the communications interface 114 is not necessary.

The input interface 115 is a circuit for respectively receiving signals from various sensors, and the like. The input interface 115 may be connected respectively, for example, to a manual switch 47A, the seating sensor 46, vehicle speed sensor 49, inclination sensor 20, front pressure sensor 22, and rear pressure sensor 23. The manual switch 47A is a switch for instructing the controller 47 to switch on a power supply and start a calibration process, or the like, and it is provided inside the driver's cabin 36. The manual switch 47A is operated by the operator of the dump truck 11.

The output interface 116 is a circuit for externally outputting control signals from the controller 47. The external display lamp set 48 and the printer 47B, which forms one example of an external output device, are connected to the output interface 116, for instance. The external output device is not limited to the printer 47B and various types of storage devices, such as a flexible disk device, optical disk device, hard disk device, semiconductor memory device, or the like, may be used. It is possible to analyze the operating efficiency of the dump truck 11, and the like, by recording the loaded weight measured by the controller 47, together with the measurement date and time, and the like, on a recording medium.

The composition shown in FIG. 5 is one example and the present invention is not limited to this example. For instance, the controller 47 may also be constituted by a hardware circuit comprising a logical LSI, or the like.

Figure 6:
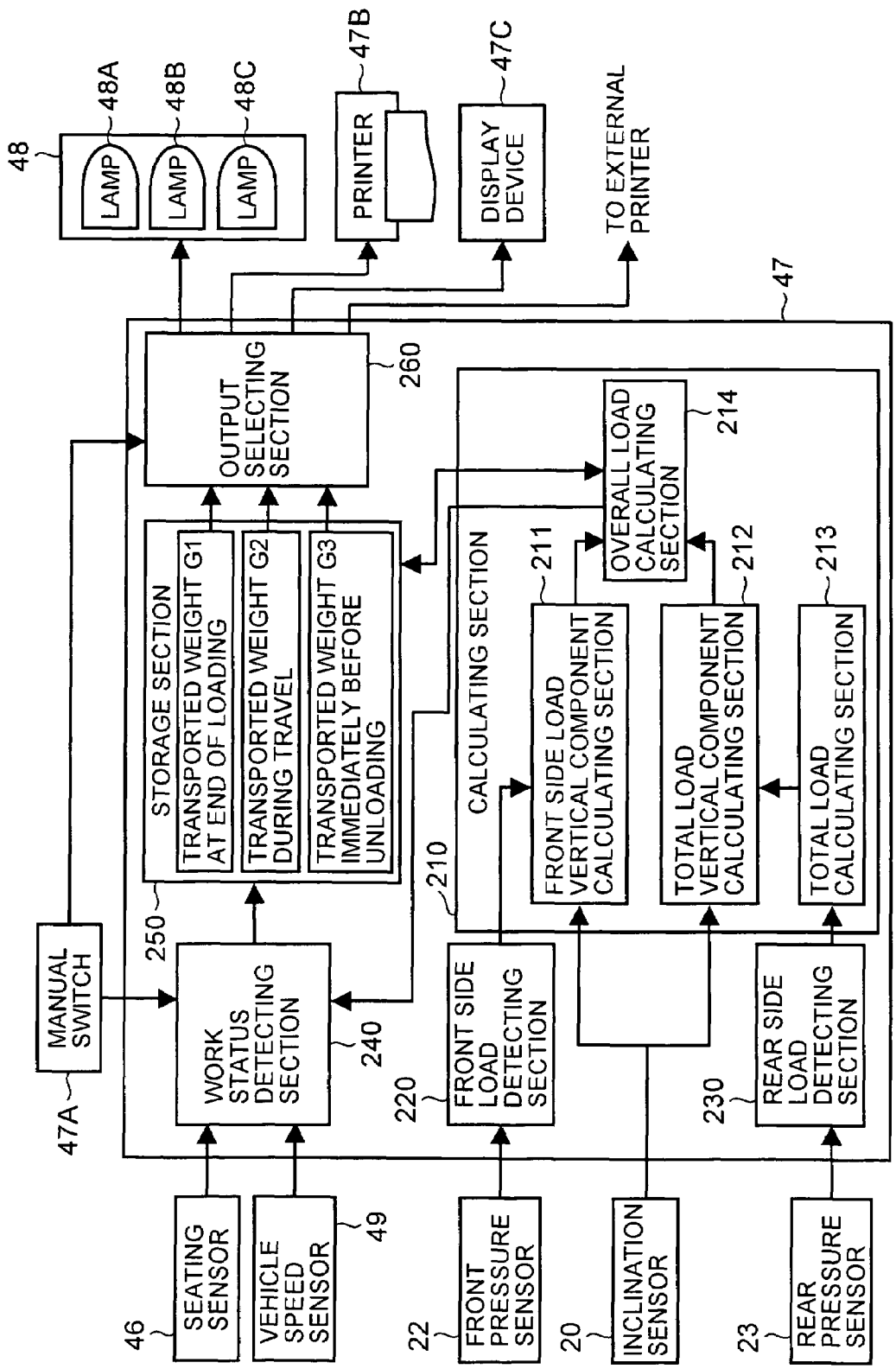
FIG. 6 is a block diagram showing the functional composition of a controller.

FIG. 6 is a block diagram focusing on the functional composition of the controller 47. The controller 47 may comprise, for example, a calculating section 210, a front side load detecting section 220, a rear side load detecting section 230, a work status detecting section 240, a storage section 250 and an output selecting section 260. Firstly, the peripheral functions of the calculating section 210 will be described, whereupon the details of the calculating section 210 will be described.

The front side load detecting section 220 detects the load applied to the front suspension cylinder 14 (the "second load"), on the basis of the detection signal from the front pressure sensor 22. Similarly, the rear side load detecting section 230 detects the load applied to the rear suspension cylinder 16 (the "first load"), on the basis of the detection signal from the rear pressure sensor 23. These load detecting sections 220 and 230 may be realized by means of a CPU 110 reading in and executing a microprogram code stored in the ROM 111, for example. The load detecting sections 220 and 230 do not have to be provided in the controller 47 and may also be provided in the pressure sensors 22 and 23. More specifically, the pressure sensors 22 and 23 may also be constituted by intelligent type pressure sensors provided with a signal processing LSI, or the like.

The work status detecting section 240 is one example of "work status detecting means". The work status detecting section 240 detects the respective work statuses of the dump truck 11 (empty, loading, transporting, unloading), as described with reference to FIG. 10, for example.

From the transitions in the work statuses, the work status detecting section 240 respectively detects a status where the vehicle transfers to a transporting status (loading completed status), and a status where the vehicle transfers from a transporting status to another work status (unloading status).

The work status detecting section 240 respectively inputs signals from the manual switch 47A, the seating sensor 46, and the vehicle speed sensor 49; for example. Furthermore, the loaded weight calculated by the calculating section 210 is also input to the work status detecting section 240. The work status detecting section 240 respectively detects the respective work statuses of the dump truck 11 on the basis of these signals and the loaded weight. The work status detecting section 240 may be realized by means of a CPU 110 reading in and executing a microprogram code stored in the ROM 111, for example.

The storage section 250 is an example of "storage means", and may be realized by a RAM 112, for instance. The storage section 250 can store, for example, the loaded weight calculated by the calculating section 210, the initial load in an empty state, control information, signal values from the various sensors, and the like.

Moreover, of the plurality of loaded weights calculated by the calculating section 210, the storage section 250 also stores the respective loaded weights in a prescribed plurality of work statuses detected by the work status detecting section 240. For example, the transported weight G1 at the end of loading, the transported weight G2 during transportation, and the transported weight G3 before unloading are respectively stored in the storage section 250.

These respective transported weights G1-G3 are stored respectively for each work cycle. More specifically, the storage date and time (measurement date and time), information identifying the work status, and the transported weight are stored in a mutually associated fashion in the storage section 250.

The output selecting section 260 is one example of "output selecting means". The storage section 250 and manual switch 47A are respectively input to the input side of the output selecting section 260. The external display lamp set 48, printer 47B and display device 47C are respectively connected to the output side of the output selecting section 260.

The output selecting section 260 externally outputs the transported weight of the selected work status, from among the transported weights G1-G3 of the respective work statuses stored in the storage section 250, on the basis of a selection signal input from the manual switch 47A. The output selecting section 260 may be realized by means of a CPU 110 reading in and executing a microprogram code stored in the ROM 111, for example.

Various methods be applied for selecting the transported weight. For example, the transported weight G2 during transportation is selected previously as an initial value from the various transported weights G1-G3, and under normal circumstances, the transported weight G2 during transportation is read out from the storage section 250 and is output externally. If an explicit switching instruction is input, then it is also possible to read out and output one of the other transported weights G1 or G3 from the storage section 250, instead of the transported weight G2 during transportation.

Alternatively, the output selecting section 260 may also read out and respectively output the various transported weights G1-G3 from the storage section 250 sequentially, according to a prescribed sequence (for example, the order of progress in the work cycle).

An instruction for outputting one of the transported weights G1-G3 may be issued to the controller 47 from the manual switch 47A, or it may be issued to the controller 47 from a management device situated externally to the dump truck 11, or the like.

The calculating section 210 performs calculation processes. The calculating section 210 may comprise, for example, a front side load vertical component calculating section 211, a total load vertical component calculating section 212, a total load calculating section 213, and an overall load calculating section 214.

These respective sections 211-214 are realized, for example, by a CPU 110 reading in and executing a microprogram code. More specifically, the respective sections 211-214 are functions and do not indicate physical circuit compositions. However, at least one or more of these sections 211-214 may be constituted by a physical circuit.

The front side load vertical component calculating section 211 calculates the vertical component of the front side load on the basis of the front side load detected by the front side load calculating section 220 and the angle of inclination of the vehicle body detected by the inclination sensor 20.

The total load calculating section 213 calculates the total load applied to the springs 31 and the rear suspension cylinder 16 on the basis of the rear side load detected by the rear side load detecting section 230 and the set mechanical values of the equalizer bars 30 and the like. In other words, it calculates the total of the loads applied respectively to the central wheels 18 and the rear wheels 19.

As described further hereinafter, if the central wheels 18 and the rear wheels 19 are balanced by the equalizer bars 30, as shown in FIG. 3, then the moment at the central wheels 18 (the center moment) and the moment at the rear wheels 19 (the rear moment) are equal. The center moment is derived from the product of the center load F1 and the distance D1 from the pin 29 to the spring 31 (F1·D1). The rear moment is derived from the product of the rear load F2 and the distance D2 from the pin 29 to the center of the rear suspension cylinder 16 (F2·D2).

Therefore, since (F1·D1)=(F2·D2), the equation F1=(F2·D2)/D1 can be obtained. As this equation shows, the center load F1 can be determined from the rear load F2, and the set mechanical values of the equalizer bar 30 (D1 and D2), only. By performing a calculation of this kind, the total load calculating section 213 is able to calculate the total value of the loads applied to the center and rear sides.

The total load vertical component calculating section 212 calculates the vertical component of the total load on the basis of the total load detected by the total load calculating section 213 and the angle of inclination of the vehicle body detected by the inclination sensor 20.

The overall load calculating section 214 calculates the overall load by adding together the calculation results of the front wide load vertical component calculating section 211 and the total load vertical component calculating section 212. The overall load calculated in an empty state is taken as the initial load. By subtracting the initial load from the overall load calculated when the vehicle is in a loaded state, it is possible to determine the current loaded weight.

The lighting up of the external display lamp set 48 is controlled on the basis of the loaded weight calculated by the overall load calculating section 214. Furthermore, the loaded weight thus calculated is stored in the storage section 250 and printed on the printer 47B. Moreover, for example, information such as the calculated loaded weight, the measurement date and time, and identification information for the dump truck 11, may also be transmitted to an external management device, by means of the communications interface 114.

Below, a sequence for measuring the loaded weight will be described. When detecting the loaded weight, firstly, all of the loads applied to the front wheels 17, the central wheels 18 and the rear wheels 19 are measured, when the vehicle is in an empty state with no cargo loaded in the vessel 21. In other words, the initial load prior to loading is measured. In the present specification, this measurement of the initial load is called "calibration". The initial load when the vessel 21 is empty, is the unsprung weight of the dump truck 11 in an empty state. This initial load may also be called "empty load". After measuring the initial load, the overall load when the cargo has been loaded into the vessel 21 is measured, and by subtracting the initial load from this overall load, the loaded weight of cargo is calculated.

Figure 7:
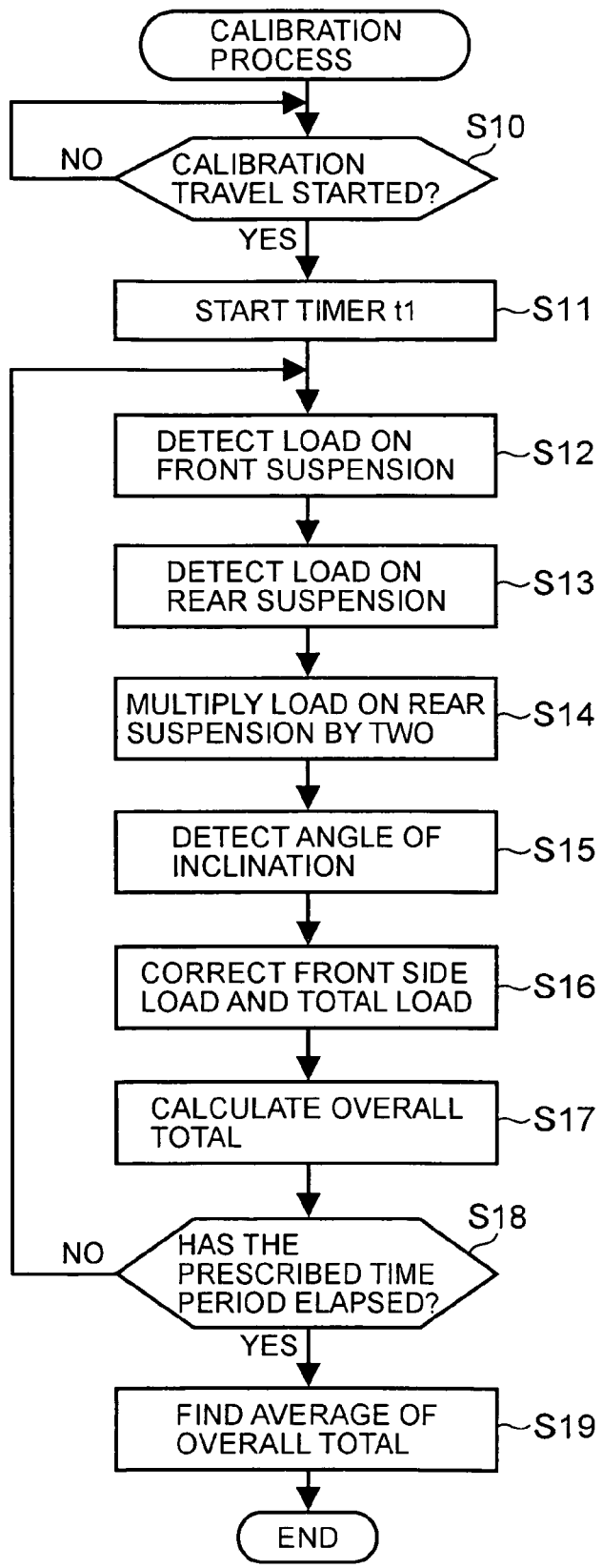
FIG. 7 is a flowchart showing a calibration process.

FIG. 7 is a flowchart showing an overview of calibration processing. Of the suspension cylinders and pressure sensors provided respectively on the left and right-hand sides of the vehicle, the following description relates to the suspension cylinder and pressure sensor provided on one side, but in practice, similar calculations are carried out for the other side as well, and the average of the values acquired on the left and right-hand side is obtained. Furthermore, here "step" is abbreviated to "S".

When performing a calibration process, the dump truck 11, with the vessel 21 in an empty state, is caused to travel in a straight line over a relatively flat terrain at a prescribed approximately uniform speed, for a prescribed time period t1 (for example, 30 seconds). This is called "calibration travel". Therefore, in this process, it is first judged whether or not calibration travel has started (S10). The judgment of whether or not calibration travel has started can be made on the basis of signals from the vehicle speed sensor 49 and the seating sensor 46, for example.

If calibration travel has started (S10: YES), then the controller 47 starts a timer for measuring the prescribed time period t1 (S11).

Furthermore, the controller 47 detects the load applied to the front suspension cylinder 14 on the basis of the signal from the front pressure sensor 22 provided in the front suspension cylinder 14 (S12). The load applied to the front suspension cylinder 14 which is detected at S12 is called the "front side load".

Next, the controller 47 detects the load applied to the rear suspension cylinder 16 (hereafter, called the "rear load") on the basis of the signal from the rear pressure sensor 23 provided in the rear suspension cylinder 16 (S13).

The controller 47 multiplies the detected rear load by two (S14). In this way, the sum of the rear load and the load applied to the spring 31 (hereafter, called the "center load") is determined. This sum is called the "total load".

Here, step S14 will be described in more detail. As shown in FIG. 3, the central wheel 18 and the rear wheel 19 are supported on either end of a rotatable equalizer bar 30, by means of the spring 31 and the rear suspension cylinder 16. If the rotatable equalizer bar 30 is not rotated, then the moment applied to the front end of the equalizer bar 30 is equal to the moment applied to the rear end of the equalizer bar 30.

In other words, as described previously, the product of the center load F1 and the distance D1 from the pin 29 to the center of the spring 31 (namely, F1·D1) is equal to the product of the center load F2 and the distance D2 from the pin 29 to the center of the rear suspension cylinder 16 (namely, F2·D2). Therefore, it is possible to obtain the equation F1=(F2·D2)/D1, as stated previously. It can be seen that the central load F1 can be derived from this equation by multiplying the rear side load F2 by (1+D2/D1), (namely, F1=F2×(1+D2/D1)).

In the present embodiment, a pin 29 is provided in approximately the central portion of the equalizer bar 30, and the values of D1 and D2 are approximately the same (D1=D2). Since the respective distances from the pin 29 forming the fulcrum point are equal, then the rear load F2 is approximately equal to the central load F1 (F1=F2). Consequently, it is possible to determine the total load (F1+F2) simply by multiplying the rear load F2 by two.

Next, the controller 47 detects the angle of inclination of the dump truck 11 in the forward/rearward direction, on the basis of the signal from the inclination sensor 20 (S15). The controller 47 corrects the front side load, and the total of the central load and the rear load, to respective vertical component loads on the basis of the angle of inclination (S16). By this means, a corrected value for the front side load applied to the front wheels 17 and a corrected value for the total load applied to the central wheels 18 and the rear wheels 19 are derived.

The controller 47 calculates an overall load value by adding together the corrected value of the front load and the corrected value of the total load (S17). The controller 47 stores this overall load value in the storage section 250 and it repeats steps S12 to S17 until the prescribed time period t1 has passed (S18).

When the prescribed time period has passed (S18: YES), the controller 47 finds the average of the plurality of overall load values stored in the storage section 250 (S19). This average is taken as the initial load of the dump truck 11. The controller 47 stores the initial load thus calculated in the storage section 250 and then terminates this processing sequence.

Figure 8:
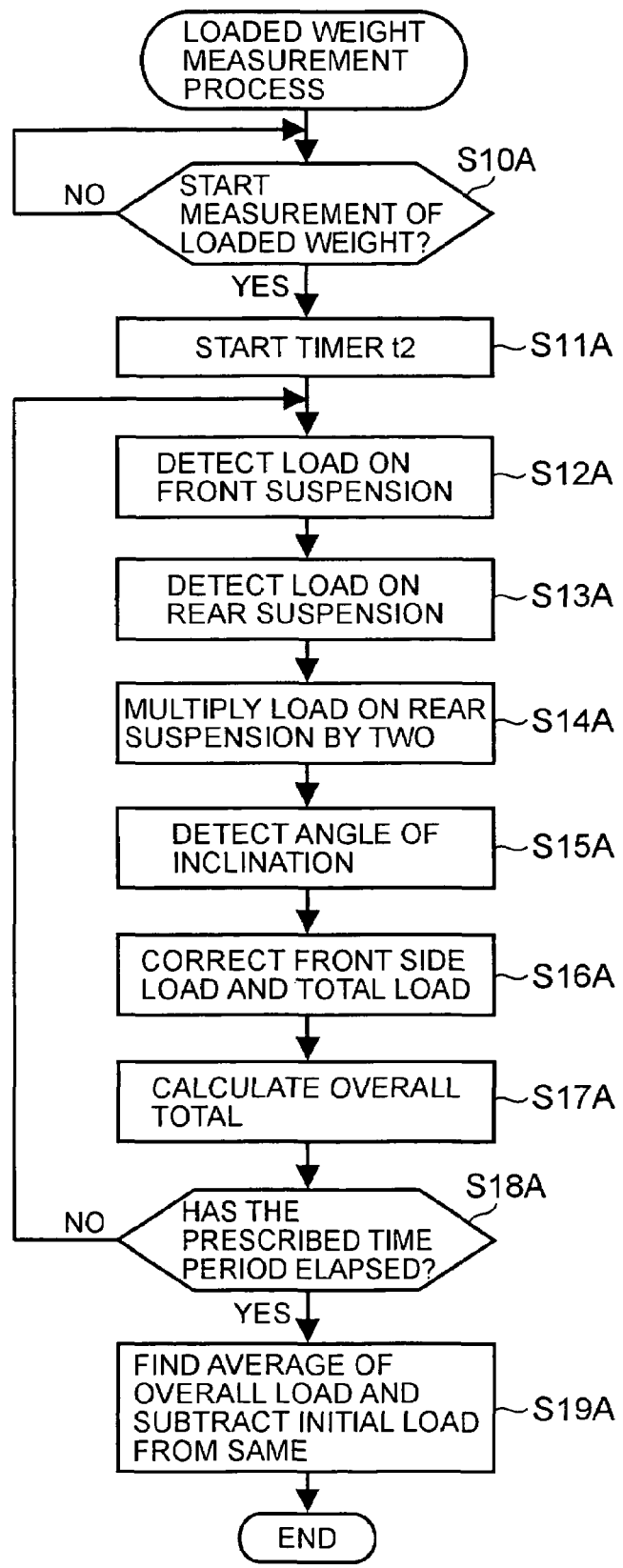
FIG. 8 is a flowchart illustrating a loaded weight measurement process.

FIG. 8 is a flowchart showing an overview of a process for measuring the loaded weight when cargo has been loaded into the vessel 21. This process can be performed by a sequence that is substantially the same as that in S10-S19 shown in FIG. 7.

Firstly, the controller 47 judges whether or not a loaded weight measurement process has started (S10A). For example, if the manual switch 47A includes a "measurement start switch", then the loaded weight measurement process is started when the operator activates this switch (S10A: YES).

Here, for example, the start date and time of the loaded weight measurement process is compared with the registration date and time of the initial load stored in the storage section 250. If a prescribed period of time or more has passed since the registration date and time of the initial load, then it is possible to prompt the operator to carry out new registration of the initial load, via the external display lamp set 48 or the display device 47C. Alternatively, when outputting a measurement result from the loaded weight measurement process, it is possible to output the initial load value used as a basis for the measurement, and the date and time of registration of that initial value, together with the result.

When a measurement process is started, the controller 47 starts a timer for measuring a second prescribed time period $t_2$ (S11A). This timer $t_2$ is used in order to measure the loaded weight a plurality of times.

Similarly to the calibration process described above, the controller 47 detects the front side load and the rear side load (S12A, S13A), and derives a total load by multiplying the rear load by two (S14A). The controller 47 then detects the angle of inclination (S15A), and respectively corrects the front side load and the total load on the basis of the angle of inclination (S16A).

The controller 47 calculates the overall load by adding together the vertical component of the front side load and the vertical component of the total load (S17A). The controller 47 stores the calculated overall load value in the storage section 250 and it repeats steps S12A to S17A until the prescribed time period $t_2$ has passed (S18A).

When the prescribed time period $t_2$ has elapsed (S18A YES), the controller 47 finds the average of the plurality of overall loads stored in the storage section 250 and then calculates the loaded weight by subtracting the initial load from this average value (S19A).

According to the present embodiment as described above, the central wheel 18 is supported on the equalizer bar 30 by means of a spring 31 and the rear wheel 19 is supported on the equalizer bar 30 by means of a rear suspension cylinder 16.

Therefore, the rear load is determined by a rear pressure sensor 23 provided in the rear suspension cylinder 16, and the total of the central load and the rear load is found by multiplying the rear load by two. In the present embodiment, it is sufficient only to measure the rear load directly, and there is no need to measure the load applied to the spring 31 supporting the central wheel 18. Consequently, it is not necessary to provide a sensor for detecting the amount of extension or compression of the spring 31.

Furthermore, in the present embodiment, even if the spring 31 is replaced with a suspension cylinder for the purpose of supporting the central wheels 18, it is not necessary to provide a pressure sensor in order to determine the load applied to the suspension cylinder.

In this way, according to the present embodiment, it is possible to measure the loaded weight accurately by means of a small number of sensors, and hence loaded weight measurement performance for the dump truck 11 can be improved without significantly increasing manufacturing costs.

With the passage of time, the oil 40 inside the suspension cylinders 14 and 16 decreases, and hence variation in the output of the pressure sensors 22 and 23 can be expected. In order to correct this variation, it is desirable that the initial load be measured by performing calibration at periodic intervals.

Figure 9:
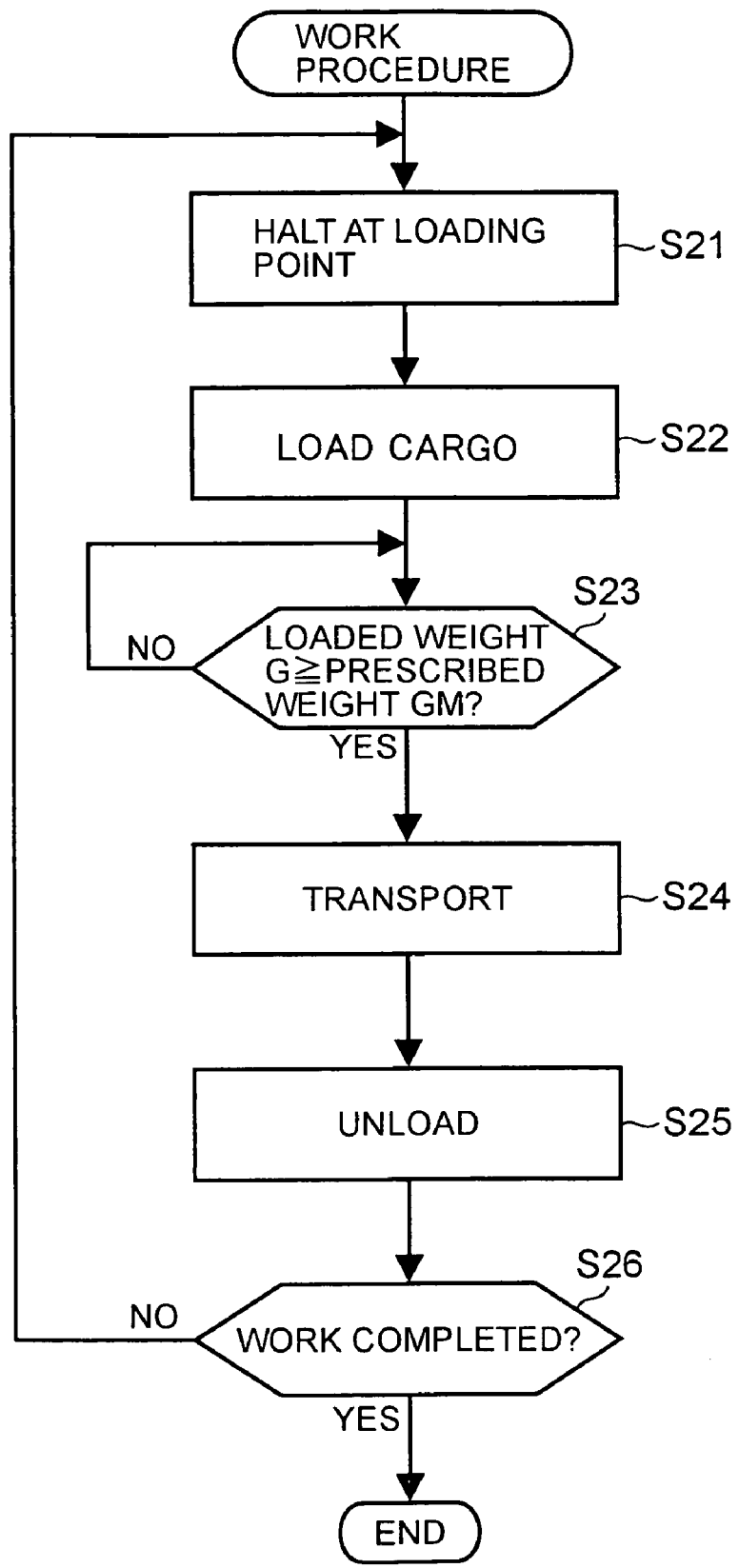
FIG. 9 is a flowchart illustrating a work sequence of a dump truck.

Next, a method for measuring the loaded weight for each one of a prescribed plurality of work statuses will be described with reference to FIG. 9-FIG. 11. In the present embodiment, the loaded weight is calculated respectively for each work status included in one work cycle of the dump truck 11, in such a manner that the loaded weight (transported weight) for prescribed work statuses is stored.

Firstly, a general work procedure of the dump truck 11 will be described. FIG. 9 shows a work procedure of the dump truck 11. The dump truck 11 halts at-a loading point, with the empty vessel 21 seated on the rear frame 28 (S21). The loading operator loads a cargo to be conveyed, such as sand, into the vessel 21, by means of a hydraulic shovel, wheel loader, or the like (S22).

When the loaded weight G has become equal to or greater than a prescribed value GM (S23: YES), the dump truck 11 starts to travel and transports the cargo to a prescribed unloading point (S24). Upon arriving at the unloading point, the dump truck 11 moves the vessel 21 to the "tipped up" position, thereby unloading the cargo (S25).

When unloading has completed, the dump truck 11 moves the empty vessel 21 to the "tipped down" position, returns to the loading point and starts loading again (S26).

This sequence of steps S21-S25 is taken as one work cycle, and the dump truck 11 repeats this work cycle a plurality of times.

Next, a method for measuring and outputting the transported weight of the cargo transported by the dump truck 11 from the loading point to the unloading point, at a prescribed timing, will be described. In the following description, it is assumed that calibration has already been completed.

The controller 47 detects the vehicle speed V from the signal from the vehicle speed sensor 49, and it judges whether or not the vessel 21 is seated from the signal from the seating sensor 46. Furthermore, the controller 47 calculates respective loaded weight values on the basis of the signals from the pressure sensors 22 and 23 and the inclination sensor 20 (S10A-S19A).

The controller 47 stores the loaded weight values detected at respective measurement timings, together with the signal values output by the sensors 20, 22, 23, 46 and 49, in the storage section 250.

Below, the sequence is described in further detail, in accordance with the work cycle (S21-S25) described above. FIG. 10 shows timing charts illustrating the vehicle speed V, the seating status of the vessel 21 and the transition in the loaded weight G during one work cycle.

Figure 10:
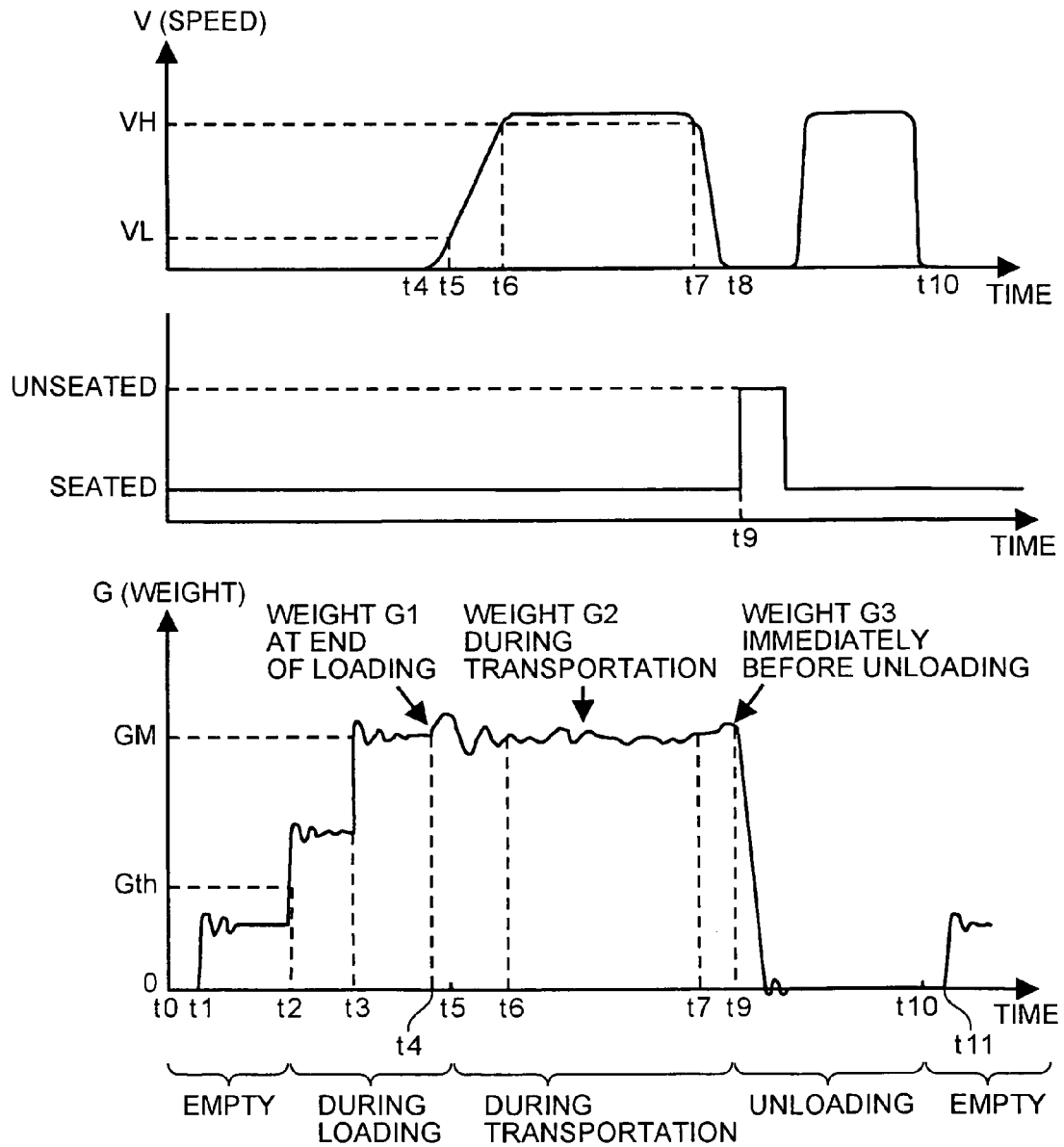
FIG. 10 is a timing chart illustrating various work statuses of a dump truck.

The upper chart on FIG. 10 shows how the speed V of the dump truck 11 varies during the course of a work cycle. The vertical axis indicates the vehicle speed V and the horizontal axis indicates time.

The middle chart on FIG. 10 shows how the seating status of the vessel 21 (namely, the seated or unseated position of the vessel 21) varies during the course of a work cycle. The vertical axis indicates the status of the vessel 21 and the horizontal axis indicates time.

The lower chart on FIG. 10 shows how the transported weight G of the dump truck 11 varies during the course of a work cycle. The vertical axis indicates the transported weight G and the horizontal axis indicates time.

It is assumed that at a certain time $t_0$, the dump truck 11 is parked at the landing point and no cargo has been loaded into the vessel 21. In other words, at time $t_0$, the dump truck 11 is parked in an empty state at the loading point.

When time $t_1$ is reached, cargo starts to be loaded into the vessel 21 by means of a bulldozer, wheel loader, or other industrial machine. As the loading operation progresses, the loaded weight G increases in a stepwise fashion. Finally, when time $t_2$ is reached, the loaded weight G in the vessel 21 reaches a previously determined weight threshold Gth. This threshold value Gth may be set to approximately one half of the rated loaded weight.

The time period until the loaded weight G reaches the threshold value Gth (t0-t2) corresponds to an empty status. When the loaded weight G reaches the threshold value Gth, then the vehicle transfers to a loading status.

The loading operation continues even after the loaded weight G has exceeded the threshold value Gth. At time t3, the loaded weight G reaches a prescribed upper limit GM. This upper limit GM can be set to approximately 100% of the rated loaded weight.

When the loaded weight G has reached the upper limit GM, the dump truck 11 starts to travel. In this way, transportation of the cargo is started (t4). More specifically, the dump truck 11 starts a transition from the loading status to the transporting status.

As the truck travels, the speed V increases, and at time t5, it exceeds a threshold value VL for detecting travel. Accordingly, the transition from the loading status to the transporting status is completed. Furthermore, when time t6 is reached, the vehicle speed V rises above the threshold value VH for average detection (where VH>VL), and it continues to rise thereafter until it finally assumes an approximately uniform value.

When the dump truck 11 approaches the unloading point, the vehicle speed V is gradually lowered. At time t7, the vehicle speed V falls below the threshold value for average detection VH, and at time t8, the dump truck 11 halts at the unloading point.

The dump truck 11 halted at the unloading point extends the lift cylinders 26 at time t9. Consequently, the vessel 21 is tipped up and the cargo is unloaded externally from the vessel 21. With the start of this unloading operation, the loaded weight G declines. When the vessel 21 is tipped up, the vessel 21 separates from the rear frame 28 and hence changes from a seated status to an unseated status. At time t9, the dump truck 11 transfers from a transporting status to an unloading status.

When unloading has been completed, the dump truck 11 tips the vessel 21 down and returns to the loading point. When the vessel 21 is tipped down, the vessel 21 becomes seated again on the rear frame 28 and hence returns from an unseated status to a seated status. At time t10, the dump truck 11 arrives at the loading point and a new loading operation is started (t11).

In a work cycle of this kind (time t0-t10), the period from time t0 until time t2 at which the loaded weight exceeds the weight threshold Gth is called an "empty status" in the present specification. Similarly, the period from time t2 until time t5 at which the dump truck 11 exceeds the prescribed threshold value for detecting travel VL, is called a "loading status". The period from time t5 until time t9 at which the dump truck 11 starts to unload is called a "transporting status". The period from time t9 until time t10 at which the dump truck 11 returns to the loading point and halts at same is called an "unloading status".

During this work cycle, the controller 47 calculates the loaded weight at each time point and displays the loaded weight in real time on the display device 47C. It also computes the transported weight at the prescribed measurement timings listed below. The controller 47 stores the transported weight values calculated at respective measurement timings in the storage section 250, together with information such as the measurement date and time.

The measurement timings are, for example: at the end of loading (immediately before starting transportation), during transportation, and before unloading (after completing transportation).

The transported weight G1 at the end of loading is the loaded weight of the dump truck 11 that has been loaded with cargo, immediately before the dump truck 11 starts to travel at time t5.

The transported weight G2 during travel is the average of the loaded weight values in the time period during which the dump truck 11 transports the cargo to the unloading point (t6-t7).

The transported weight G3 immediately before unloading is the loaded weight when the dump truck 11 has arrived at the unloading point, immediately before the vessel 21 is tipped up and unloading is carried out at time t9.

The controller 47 is able to output at least one of these three types of transported weights G1, G2, G3, externally, together with information indicating what type of transported weight the value belongs to.

The controller 47 may be able, for instance, to output all three types of transported weights G1, G2 and G3, or it may be able to output only one or a plurality of transported weights as selected by the manual switch 47A, after the completion of the work cycle.

Furthermore, it is also possible to adopt a composition in which the type of transported weight to be output is established initially and only that type of transported weight value is output. Furthermore, transported weight values that have not been output may be stored in the storage section 250 in such a manner that they can be output at a later time, or they may be erased immediately.

Figure 11:
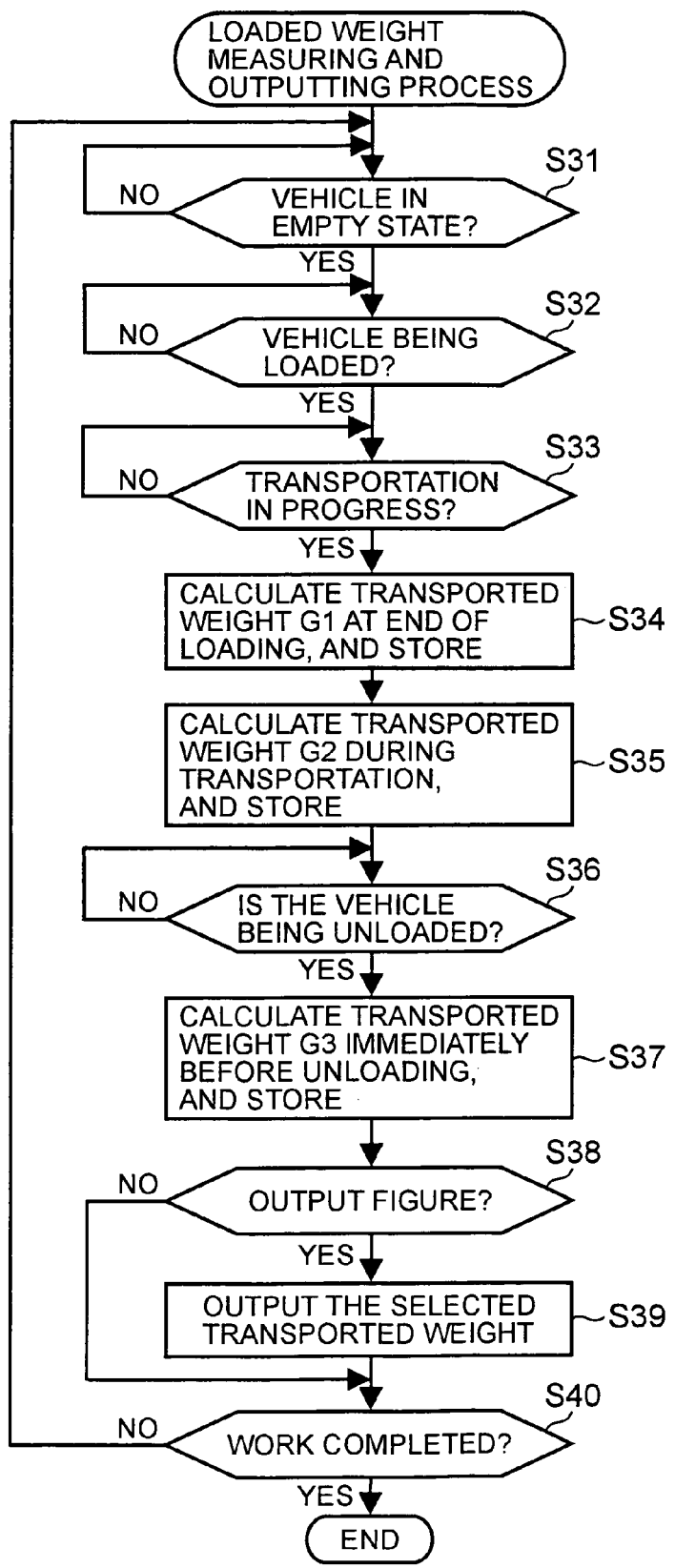
FIG. 11 is a flowchart showing a process for measuring, storing and outputting loaded weight values at a previously established measurement timing.

FIG. 11 is a flowchart showing a process for measuring and outputting the transported weight in respective work statuses of the work cycle.

When the work cycle is started, the controller 47 confirms that the dump truck 11 is in an empty state (S31).

For example, the controller is able to judge that the truck 11 is in an empty state if both of the following two conditions are satisfied on the basis of the respective signals from the sensors 20, 22, 23, 46 and 49. In other words, if the two conditions are satisfied, firstly, that the vessel 21 is in a seated position, and secondly, that the loaded weight G is less than the threshold value Gth, then the controller 47 is able to judge that the dump truck 11 is in an empty state. These two conditions may be called "prescribed empty status detection conditions", for example.

If it is judged that the dump truck 11 is in an empty state (S31: YES), then the controller 47 waits until the dump truck 11 transfers to a loading status (S32).

For example, the controller is able to judge that the truck 11 has transferred from an empty status to a loading status if all of the following three conditions are satisfied on the basis of the respective signals from the sensors 20, 22, 23, 46 and 49. Namely, if the three conditions are satisfied: firstly, that the vessel 21 is in a seated position; secondly, that the loaded weight G is equal to or greater than the threshold value Gth, and thirdly, that the vehicle speed V is less than the threshold value VL for detecting travel. These three conditions may be called "prescribed loading status detection conditions", for example.

If a transition to a loading status is detected (S32:YES), then the controller 47 waits until the vehicle transfers from a loading status to a transporting status (S33).

For example, the controller is able to judge that the truck 11 has transferred from a loading status to a transporting status if all of the following three conditions are satisfied on the basis of the respective signals from the sensors 20, 22, 23, 46 and 49. Namely, if the three conditions are satisfied: firstly, that the vessel 21 is in a seated position; secondly, that the loaded weight G is equal to or greater than the threshold value Gth, and thirdly, that the vehicle speed V is equal to or greater than the threshold value VL for detecting travel. These three conditions may be called "prescribed transporting status detection conditions", for example.

If it is detected that the dump truck 11 has transferred to a transporting status (S33: YES), then the controller 47 calculates the transported weight G1 at the end of loading, and stores this transported weight value in the storage section 250 (S34). The transported weight G1 at the end of loading is the transported weight at the time that the dump truck 11 transferred from a loading status to a transporting status.

The transported weight G1 at the end of loading can be calculated in the following manner. For example, the controller 47 reads out the respective loaded weight values measured at prescribed time intervals (for example, approximately every two seconds) before time t5 at which the vehicle speed V exceeds the threshold value VL, from the storage section 250, and it calculates the average of these values. The controller 47 measures the loaded weight G in real time, at a prescribed short cycle. This measurement data is then stored in the storage section 250. The controller 47 calculates the transported weight G1 at the end of loading by finding the average of the loaded weights in the prescribed time period after the loading operation has ended and immediately before travel starts.

Thereupon, the controller 47 calculates the transported weight G2 during transportation (S35).

The controller 47 calculates the transported weight G2 during transportation by reading out respective loaded weight data measured in the period (t6-t7) during which the vehicle travels at a speed V exceeding the threshold value VH for average detection, from the storage section 250, and calculating the average of this data.

If the vehicle speed V has fallen below the threshold value VH during the transportation period from time t6 to time t7, then it can be imagined that the dump truck 11 has had to accelerate and decelerate, and that it has been passing over difficult terrain, for example. Loaded weight values measured in circumstances such as these can be expected to have low accuracy, and therefore they may be excluded when calculating the transported weight G2 during transportation.

If, for example, the vehicle speed V has fallen below the threshold value VH during the transportation period, then a mark is applied to the data measured during that time when the data is stored in the storage section 250, and when the transported weight G2 is calculated, the marked data can be left unread from the storage section 250.

Next, the controller 47 waits until the dump truck 11 transfers from a transporting status to an unloading status (S36).

For example, if an unseated status of the vessel 21 (a state where the vessel 21 is separated from the rear frame 28) is detected on the basis of a signal from the seating sensor 46, then the controller 47 is able to judge that the truck has transferred to an unloading status. Alternatively, if the operator instructs the extension of the lift cylinders 26 by operating an unloading lever (not illustrated), the controller 47 may judge that the vehicle has transferred to an unloading status on the basis of the operation of the lift cylinders 26.

If the controller 47 detects that the dump truck 11 has transferred from a transporting status to an unloading status (S36: YES), then it calculates the weight before unloading G3 and stores this weight value in the storage section 250 (S37).

For example, the controller 47 respectively reads out the loaded weight data measured during a prescribed time period (for example, two seconds) before the time t9 at which the vehicle transfers to an unloading status, from the storage section 250, and it calculates the average of this data as the weight G3 before unloading.

When the work cycle has ended, the controller 47 judges whether or not to output a transported weight on the basis of an output instruction input from an external source, for example (S38).

If the transported weight is to be output (S38: YES), the controller 47 externally outputs at least one or more type of transported weight selected from the three types of transported weights (transported weight G1 at the end of loading, transported weight G2 during transportation, and transported weight G3 before unloading) (S39).

The controller 47 judges whether or not all of the work has been completed (S40), and if it has been completed (S40: NO), then the sequence returns to S31 and the respective steps described above are repeated. By this means, the transported weights G1-G3 are respectively measured for the new work cycle and are stored in the storage section 250. When all of the work has been completed (S40: YES), the controller 47 terminates the processing sequence.

In the present embodiment as described above, the controller 47 is able to detect the current work status of the dump truck 11 on the basis of the signals from the sensors 20, 22, 23, 46 and 49.

The controller 47 respectively calculates the transported weights G1-G3 in the previously established work statuses, and stores these weight values in the storage section 250. Furthermore, the controller 47 externally outputs the selected transported weight value of the transported weights G1-G3 for the respective work statuses stored in the storage section 250.

Consequently, according to the present embodiment, it is possible t use a suitable transported weight in accordance with the working environment of the dump truck 11, and hence the operating efficiency of the dump truck and the state of progress of the work, and the like, can be managed more effectively.

The transported weight values which are measured and stored are not limited to the respective transported weights G1, G2 and G3 described above. Apart from these, it is also possible to calculate, store and output the transported weights at other desired measurement timings.

Furthermore, it is also possible to store other information which can be used to ascertain the state of progress of the work, and the like, in addition to the transported weight. For example, a composition may be adopted whereby, if the dump truck 11 is in an loading status, then respective loaded weights during the loading status can be measured, stored in the storage section 250, and output. By this means, for example, it is also possible to obtain work management information, such as how much cargo to load in each loading action by a wheel loader or other machine, and this helps to improve work efficiency.

The processes described above may also be represented in the following manner, for example.

A loaded weight measurement device for a dump truck 11 capable of calculating the loaded weight of the dump truck 11 at prescribed times storing same in a storage section 250; which comprises the following steps:

steps S31-S33 for judging whether or not the dump truck 11 has transferred to a previously established work status (transporting status);

step S34 for calculating the transported weight G1 before travel (at the end of loading), immediately before the transition to the prescribed work status, if it is judged that the dump truck 11 has transferred to the prescribed work status (S31: YES, and S32: YES, and S33: YES), the transported weight G1 being calculated on the basis of the respective loaded weight values measured within a prescribed time and stored in the storage section 250 (a prescribed time period before time t5), and storing the transported weight G1 before travel thus calculated in the storage section 250;

step S35 for calculating a transported weight G2 during travel on the basis of the respective loaded weight values stored in the storage section 250 during the period in which the dump truck 11 is transferred to the prescribed work status (time t6-t7), and storing the transported weight G2 during travel thus calculated in the storage section 250;

step S36 for judging whether or not the dump truck 11 has transferred from the prescribed work status to another work status following that work status S36;

step S37 for calculating the transported weight G3 immediately after the end of the prescribed work status (before unloading) on the basis of the respective loaded weight values measured and stored in the storage section 250 during a prescribed time period (a prescribed time period before time t9), if it is judged that the dump truck 11 has transferred to another work status (S36: YES), and storing this transported weight G3 at the end of the prescribed work status in the storage section 250;

step S38 for judging whether or not one or more transported weight selected from among the transported weights G1-G3 stored in the storage section 250 is to be output;

step S39 for reading out and outputting the selected transported weight from the storage section 250, if the selected transported weight is to be output (S38: YES); and step S40 for judging whether or not all of the work of the dump truck 11 has been completed;

steps S31 to S39 being repeated until it is judged that all of the work has been completed (S40: YES).

Second Embodiment

Next, a second embodiment will be described on the basis of FIG. 12. In this embodiment, a limit switch 50 is provided in order to detect whether or not the equalizer bar 30 is abutted against the stopper 51.

Figure 12:
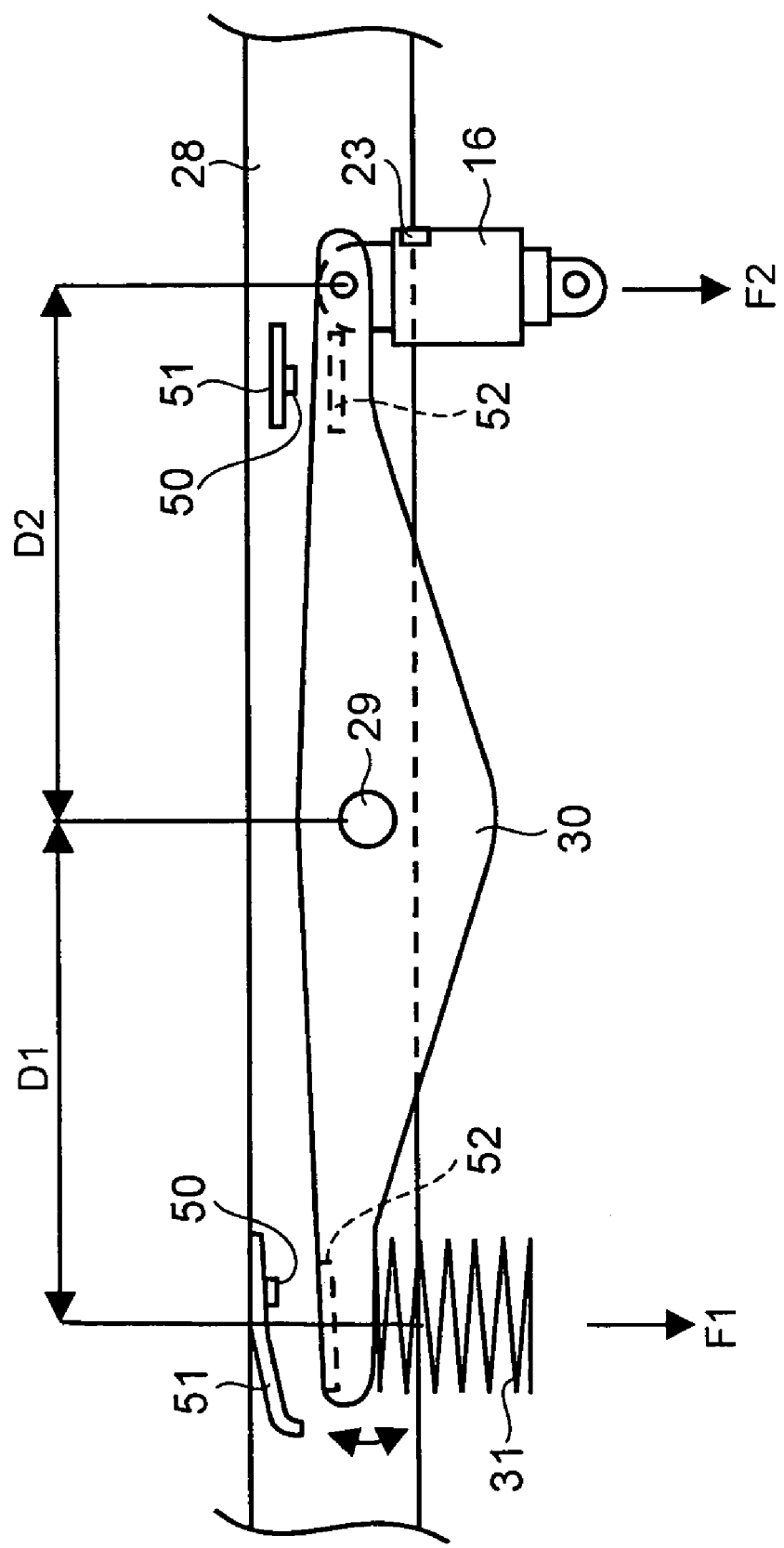
FIG. 12 is a side view of the vicinity of an equalizer bar relating to a second embodiment of the present invention.

FIG. 12 is a side view showing an enlargement of the region of an equalizer bar. In this embodiment, a limit switch 50 is provided in order to detect whether or not the equalizer bar 30 is abutted against a stopper 51. Respective limit switches 50 may be provided on the side of each stopper 51. Alternatively, limit switches 50 may be provided respectively on bases 52. The signals from the limit switches 50 are input to the controller 47.

The limit switch 50 may be constituted by a mechanical type limit switch in which an internal switch is actuated by the extension or contraction of a plunger, for example. Alternatively, for example, it may also be constituted by a proximity switch which detects the proximity of a physical body on the basis of change in a high-frequency magnetic field. Moreover, it is also possible to use a reflective type opto-electrical switch as the limit switch, for example. Furthermore, instead of the limit switch 50, a distortion gauge may be attached to at least one of the stopper 51 and the equalizer bar 30, and abutting may be detected on the basis of the signal from the distortion gauge.

In the following description, "abut" represents both a case where the base 52 of the equalizer bar 30 makes contact with the stopper 51 and a case where it approaches same to a position of near contact.

For example, the controller 47 is able to monitor whether or not the equalizer bar 30 has abutted against the stopper 51 by checking the signal from the limit switch 50 at prescribed short time intervals. Alternatively, it is also possible to connect the signal from the limit switch 50 to an interrupt input terminal of the controller 47, an abutted state being detected by generation of an interrupt input.

If it is detected by the limit switch 50 that the equalizer bar 30 is abutted against the stopper 51, then the controller 47 sets a contact judgment flag stored in the storage section 250 to "1", for example. The processes executed by the controller 47 refer respectively to this contact judgment flag, either compulsorily, or according to requirements. Alternatively, it is possible to omit the contact judgment flag and to send an interrupt immediately to the programs being executed, when an abutted state between the equalizer bar 30 and the stopper 51 is detected.

The controller 47 reports to the operator that the equalizer bar 30 has abutted against the stopper 51 by displaying a prescribed warning message on the display device 47C, or by sounding a buzzer, for example. Furthermore, the controller 47 may issue a report to an externally situated loading operator, via the external display lamp set 48.

If the measured value of the loaded weight is displayed on the display device 47C, then the controller 47 is also able to display the fact that the equalizer bar 30 and the stopper 51 are abutting. For example, values for the loaded weight measured when these members were in an abutted state can be displayed in a red color or in a flashing manner, or the like, and hence it is possible readily to distinguish these values from other measurement values which were measured in a normal state.

Furthermore, if the measurement values for the loaded weight are output from the printer 47B, then the controller 47 may cause particular text or a particular symbol (for example, a "*" symbol) to be printed alongside loaded weight measurement values which were measured when the equalizer bar 30 and the stopper 51 were in an abutted state. In the case of a color printer, it is also possible to print measurement values that were measured in an abutted state, in a red color, or the like.

If the loaded weight is measured a plurality of times and an average value is determined, then the controller 47 is also able to exclude values measured when the equalizer bar 30 and the stopper 51 were in an abutted state, in such a manner that these values are not used in the process of calculating the average value. Alternatively, if an average value is calculated by using values that were measured in an abutted state and which have a possibility of containing measurement error, then the controller 47 is able to output information indicating the reliability of the average value (for example, text or a symbol such as "#") in association with the average value.

In this way, in the present embodiment, since a limit switch 50 is provided for detecting whether or not the equalizer bar 30 and the stopper 51 are in an abutted state, it is possible readily to judge whether or not accurate measurement of the loaded weight is possible, not only when the dump truck 11 is halted in an empty state, but also during loading into the vessel 21, during travel of the dump truck 11, and during unloading of the cargo from the vessel 21. Therefore operability is improved. More specifically, it is possible readily to distinguish the reliability of the measurement loaded weight values, even while the dump truck 11 is in various different work statuses (empty status, loading status, transporting status, or unloading status).

The present invention is not limited to the embodiments described above. A person skilled in the art may be able to make various additions and modifications within the scope of the present invention. For example, the measurement timings for the transported weight are not limited to G1-G3.

Furthermore, a case is described where one pressure sensor is provided respectively in each suspension cylinder, but the present invention is not limited to this and it is also possible to provide a plurality of pressure sensors respectively in each suspension cylinder.

Moreover, an example was given in which the central wheels are supported by springs and the rear wheels are supported by rear suspension cylinders, but the present invention may also be applied to a converse configuration in which the central wheels are supported by suspension cylinders and the rear wheels are supported by springs. Furthermore, a composition may be adopted in which both the central wheels and the rear wheels are supported respectively by suspension cylinders.

An articulated type dump truck was described as an example, but the present invention is not limited to this and may also be applied to another type of dump truck, and especially, a dump truck having a plurality of wheels supported by equalizer bars.

Furthermore, the present invention is not limited to a configuration where the central wheels and the rear wheels are coupled by equalizer bars, and it may also be applied to a configuration where the front wheels and the central wheels are coupled by equalizer bars. Moreover, the present invention may also be applied to a dump truck having a plurality of wheels coupled respectively by equalizer bars, in the front/rear direction of the vehicle.

What is claimed is:

1. A loaded weight measurement method for a dump truck, comprising:
    a first step of respectively detecting a plurality of work statuses of a dump truck;
    a second step of respectively detecting a plurality of basic information for calculating the loaded weight of said dump truck;
    a third step of calculating respective loaded weight values of said dump truck in a previously established plurality of prescribed work statuses, of said respective work statuses detected in said first step, on the basis of said respective basic information detected in said second step;
    a fourth step of respectively storing said calculated loaded weight values; and
    a fifth step of outputting all or a portion of said loaded weight values thus stored, wherein
    said dump truck comprises: a set of equalizer bars respectively provided rotatably on the left and right-hand sides of a vehicle body; first vehicle wheels supported respectively by means of first suspension devices on one side of each equalizer bar; second vehicle wheels supported respectively by means of second suspension devices on the other side of each equalizer bar; and third vehicle wheels provided respectively on the left and right-hand sides of said vehicle body separately from said equalizer bars, and being supported respectively by means of third suspension devices;
    wherein said second step comprises:
    a step 2A of detecting a first load applied to either said first suspension device or said second suspension device, as one of said basic information;
    a step 2B of detecting a second load applied to said third suspension device, as one of said basic information;
    a step 2C of detecting the angle of inclination of said vehicle body as one of said basic information; and
    a step 2D of calculating said loaded weight on the basis of said first and second loads detected respectively in said steps 2A and 2B, and said angle of inclination detected in said step 2C, wherein step 2D further comprises,
    (a) a step 2D1 of calculating a total load applied to said first and second suspension devices on the basis of the ratio between the respective distances from the center of rotation of said equalizer bar to said first and second suspension devices, and said first load detected in said first step;
    (b) a step 2D2 of respectively calculating a vertical load from said total load calculated in step 2D1 and said second load detected in said second step, on the basis of said angle of inclination detected in said third step; and
    (c) a step 2D3 of calculating said loaded weight by adding together the vertical component of said first load and the vertical component of said second load calculated in said step 2D2.

2. The loaded weight measurement method for a dump truck according to claim 1, wherein in said fifth step, only the loaded weight value in the selected prescribed work status is output, of the respective loaded weight values stored in said fourth step.

3. The loaded weight measurement method for a dump truck according to claim 1, wherein of the respective work statuses detected in said first step, said plurality of prescribed work statuses include: a particular work status; a status of transition from a work status to said particular work status; and a status of transition from said particular work status to another work status.

4. The loaded weight measurement method for a dump truck according to claim 1, wherein said first step detects whether said dump truck is in an empty status, a loading status, a transporting status, or an unloading status; and said third step respectively calculates: a first loaded weight in a case where said dump truck has completed loading and is transferring from said loading status to said transporting status; a second loaded weight in a case where said dump truck is in a transporting status; and a third loaded weight in a case where said dump truck is in a status prior to unloading and is transferring from said transporting status to said unloading status; said respective loaded weights being calculated on the basis of said basic information detected respectively in said second step.

* * * * *